(12) United States Patent
Hsiao et al.

(10) Patent No.: US 6,838,508 B2
(45) Date of Patent: Jan. 4, 2005

(54) POLYOLEFIN-BASED NANOCOMPOSITE AND PREPARATION THEREOF

(75) Inventors: Ming-Siao Hsiao, Taipei (TW); Gwo-Yang Chang, Tinan Hsien (TW); Shyh-Yang Lee, HsinChu (TW); Sung-Jeng Jong, Pingtung Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 75 days.

(21) Appl. No.: 10/138,480

(22) Filed: May 6, 2002

(65) Prior Publication Data

US 2003/0153659 A1 Aug. 14, 2003

(30) Foreign Application Priority Data

Dec. 20, 2001 (TW) .......................................... 90131748 A

(51) Int. Cl.⁷ ................................................. C08K 3/34
(52) U.S. Cl. ....................... 524/445; 524/186; 524/447; 524/449; 501/145; 501/147
(58) Field of Search ................................. 524/186, 445, 524/447, 448, 449; 501/145, 146; 525/285; 523/210

(56) References Cited

U.S. PATENT DOCUMENTS 6,407,155 B1 * 6/2002 Qian et al. ................... 524/445
6,462,122 B1 * 10/2002 Qian et al. ................... 524/445
6,583,209 B2 * 6/2003 Mehta et al. ................ 524/445
6,632,868 B2 * 10/2003 Qian et al. ................... 524/445

OTHER PUBLICATIONS

M. Kawasumi; N. Hasegawa; A. Usuki; A. Okada; T. Karaguchi. Mat Res Soc Symp Proc. vol. 425 (1996) p. 311–316.*

* cited by examiner

*Primary Examiner*—Katarzyna Wyrozebski
(74) *Attorney, Agent, or Firm*—Sughrue Mion, PLLC

(57) ABSTRACT

A polyolefin-based nanocomposite and a method of preparing the same are disclosed. The polyolefin-based nanocomposite is prepared by melt kneading a mixture including (A) 40–99.8% by weight of a matrix polymer of polyolefin; (B) 0.1–30% by weight of a polyolefin compatilizer containing polar reactive groups; and (C) 0.1–30% by weight of a layered clay material having a quaternary ammonium ion bonded to the surface thereof. The quaternary ammonium ion contains (I) at least one alkyl group having at least 15 carbon atoms; and (ii) a substitutent having —Si—O—Si— linkage and at least one terminal reactive group.

27 Claims, 2 Drawing Sheets

475nm

475nm

POLYOLEFIN-BASED NANOCOMPOSITE AND PREPARATION THEREOF

BACKGROUND OF THE INVENTION

1. Field of the Invention

The present invention relates to a polymer nanocomposite, and in particular to a polyolefin-based nanocomposite prepared by melt kneading.

2. Description of the Related Art

Nanocomposites include dispersion phase having dimensions in the size ranging from 1 nm to 100 nm. The distribution of the nano-sized inorganic dispersion phase makes the nanocomposites exhibit molecular structure characteristics, such as reduced size of the inorganic particles in the dispersion, high aspect ratio of the inorganic particles, layered reinforced structure and enforced ionic bonding between inorganic phase and organic phase. The nanocomposites possessing the above characteristics accordingly can be fabricated into products that requires light-weight, high strength, high rigidity, high heat resistance, superior flame retardance, low moisture absorbability, and low permeability.

Commercially available polymer/clay dispersed nanocomposites are mainly based on Nylon 6. For example, UBE Industries Ltd. Japan has successfully produced Nylon 6-based nanocomposites, which can be fabricated into automobile parts, and high non-permeable packing films. Unitika Co., Ltd., has developed a Nylon 6-based nanocomposite which can be fabricated into automobile parts or be used as compounding materials of engineering plastics.

Nanocomposites based on other polymers are now attracting great attention from some plastics companies in the world. For example, nylon 6/clay nanodispersion formed by blend kneading developed by Allied-Signal Inc., U.S.A.; mamoacrylic paint and nanorubber developed by Kabushiki Kaisha Toyota Chuo Kenkyusho, Japan; nanonylon 66 engineering plastics by Showa Denko Kabushiki Kaisha, Japan; and nanoPET composites by Nanoco company, U.S.A are all under investigation for commercialization.

Polyolefin-based nanocomposites are now becoming more important, because a large amount of this kind of composites is used in various industries. For example, polypropylene-based nanocomposites have been largely used in automobile-related industries to replace conventional polypropylene composites.

However, since polyolefins, such as polypropylene, are non-polar functional polymers, the compatibility between the organic polyolefin and the inorganic dispersion phase, usually clay material, is inferior. To overcome the compatibility problem, one approach is to tropically functionalize the polyolefins by using a catalyst to produce polar functional groups, followed by melt kneading the modified polyolefin with organic clay material. One disadvantage of this approach is the use of a catalyst for the modification of the polyolefin. Another approach is to introduce a small amount of polymer into the organic layered clay material to swell the layered clay material. The swollen clay material is then blended with compatilizer, followed by blending with polyolefin in a batch reactor to obtain nanocomposite material. This approach involves a number of processing steps, and thus the economic effect is not high. There is another proposal which solves the compatibility problem by organization or organomodification treatment. For example, a layered-structure clay material may be modified with organic moieties attached thereto through ionic bonding, where the clay material is dispersed in an aqueous solution of an organic onium salt so as to cause the ion-exchange to take place. By doing so, the compatibility of the layered-structure clay material, the compatilizer and the polyolefin is improved. However, only the surface of the particles of the layered-structure clay material is modified and the dispersion of the particles of the clay materials is improved, the interlayer spacing (d-spacing) of the layered clay material is not improved and the compatibility problem is not completely solved.

SUMMARY OF THE INVENTION

It is therefore an object of the invention to provide a polyolefin-based nanocomposite that exhibits superior compatibility.

It is another object of the invention to provide a melt kneading process for the preparation of a polyolefin-based nanocomposite material.

It is further an object of the invention to provide a method of modifying a layered clay material.

The above objects of the invention are attained by modifying the layered-structure clay material by intercalating a modifier, a quaternary ammonium containing at least one terminal reactive group and —Si—O—Si linkage into the interlayers of the layered-structure clay material by means of ion-exchange. By using the modification method mentioned above, the inorganic layered-structure clay materials become hydrophobic and reactive-group carrying. Thus, when the modified layered clay material is then blended with a polyolefin compatilizer containing polar reactive groups, followed by melt kneading with the polyolefin, a polyolefin-based nanoocmposite material with superior compatibility is obtained.

DETAILED DESCRIPTION OF THE INVENTION

The layered clay materials which may be suitably used according to the invention are layer-structured silicate minerals having a cation exchange capacity(CEC) of 50–200 meq/100 g. Examples of these silicate minerals include but are not limited to smectite clay, vermiculite, halloysite, sericite, and mica. Among them, smectite clay is preferred. Smectite clay includes montmorillonite, saponite, beidellite, nontronite, hectorite and stevensite etc.

According to the invention, the modifier, quaternary ammonium containing at least one terminal reactive group and —Si—O—Si linkage is prepared by subjecting a quaternary ammonium having an alkoxysilyl group and a coupling agent to a sol-gel reaction. The ammonium salts having alkoxysilyl group, which are suitably used according to the invention, have the general formula as indicated below:

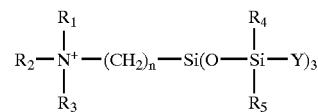

wherein $R_1$ is a alkyl having at least 15 carbon atoms; $R_2$, $R_3$ can be same of different and are an alkyl having 1–12 carbon atoms;
$R_4$ and $R_5$ can be same or different and are methoxy or ethoxy; Y is a terminal group having a substitutent selected from the group consisting of carboxy, hydroxy, amino, vinyl, sulfo and epoxy. The coupling agent used in the invention is an alkoxysilane having reactive terminal groups. The reactive terminal groups include carboxy, hydroxy, amino, vinyl sulfo and epoxy.

The modification of the layered clay materials is conducted by immersing the layered clay materials into an aqueous solution containing the modifier obtained by the above-mentioned process for about 2–3 hours to cause the ion-exchange to take place. After the ion-exchange process is completed, the immersed layered clay material is then washed with hot water, and dried to remove residual ammonium ions. The modified layered clay materials so obtained have a d-spacing of at least 30° A.

The organomodified layered clay materials are then blended with polar reactive group-containing compatilizers to obtain a homogeneous blend with the layered clay materials are further exfoliated and intercalated. The compatilizers suitably used in this invention are polyolefin compatibilizers, such as anhydride-modified oligomers or hydroxy-containing polyolefin oligomers. Among them, polypropylene-maleic anhdydride copolymer is preferred. The blending is usually carried out by first dissolving polyolefin compatibilizers in an organic solvent, such as toluene and xylene in which the polyolefin compatibilizer is soluble and the organomodified clay material is evenly dispersed, at an elevated temperature, such as 90° C. After a solution of the polyolefin compatibilizer is formed, the solution is then blended with the organomodified clay material at an elevated temperature, such as at 110° C., and dried to obtain a homogeneous blend. The weight ratio of the organomodified clay material and the polyolefin compatibilizer is 1/1–1/3.

According to the process of preparing a polyolefin-based nanocomposite of the invention, the homogeneous blend so obtained is then subject to a melt kneading process with a polyolefin or a matrix polymer containing polyolefin. Examples of the polyolefin or matrix polymer containing polyolefin that may be used for this purpose include polyethylene, polypropylene, poly(1-butene), poly(1-hesene), polyisopropylene, poly(3-methyl-1-hexene), poly(4-methyl-1-hexene), copoly(ethylene/propylene), copoly(ethylene/1-butene), copoly(propylene/4-methyl-1-pentene), copoly(propylene/1-butene), copoly(ethylene/propylene/1-butene), and copoly(decene/1-methyl-1-pentene) and the like. Among them, polypropylene is preferred.

According to the invention, as an alternative, the blending step of the organomodified clay material and the polyolefin compatibilizer can be omitted. That is, the three ingredients, the matric polymer containing polyolefin, the polyolefin compatibilizer and the organomodified clay material can be directly subject to a melt kneading process to obtain the polyolefin-based nanocomposite material of the invention. In the melt kneading process, the reactive functional groups of the organomodified clay material and the compatibilizer are reacted.

The weight ratio of the matrix polymer containing polyolefin, the polyolef in compatibilizer and the organomodified layered clay material is in the range of 40–99.8%: 0.1–30%: 0.1–30%, preferably in the range of 70–99.8%: 0.1–10%: 0.1–20%.

The melt kneading is usually conducted in a closed system by using a melt-kneading device, such as a Banbury mixer with a rotator, a single screw or twin-screw extruder or a kneader at a temperature that is 20–30° C. higher than the melting point of the polyolefin or polymer matrix containing the polyolefin. Usually, the melt kneading is carried out at a temperature of at least 180° C.

In the kneading process, various additives, which are conventionally used in a polyolefin, such as inorganic or organic fillers, anti-oxidants, UV absorbents, light stabilizers, anti-static agents, plasticizers, flame-retardants, lubricants and the like may be added at such a level that such an additive does not interfere with the advantages of the invention.

The polyolefin/clay nanocomposite materials so obtained usually have a d-spacing greater than 30° A. or preferably greater than 40° A. Also, the layered clay materials within the composites are exfoliated and derivatized to an extent that is intercalated and fully exfoliated. In this manner, by adjusting the weight ratio of the clay material and the compatibilizer, a nanocomposite with superior physical and mechanical characteristics can be obtained. As can be seen from the hereinafter-stated examples, the obtained nanocomposite material has a heat deformation temperature (H.D.T) of 138° C. which is 18° C. higher than the H.D.T. of a composite which is formed by a conventional method. The nanocomposite materials prepared by the method of the invention also exhibit a flexural modulus (F.M.), which is 1.17 times of that of a composite material prepared by a conventional method.

The reactive terminal groups of the layered organomodified clay materials are reacted directly with the compatilizer in the subsequent melt kneading process to form chemical bonds in the interlayers of the layered clay materials, and thus the compatibility of the polyolefin and the clay materials is further improved. Moreover, the process of the invention for the preparation of polyolefin-based nanocomposite materials involves no polymerization or catalyzed reaction, and thus is more suitable for use in industry.

BRIEF DESCRIPTION OF THE DRAWINGS

Without any intent to limit the scope of the invention, the present invention will be hereinafter explained in more detail with reference to the following examples and accompanying drawings in which.

EXAMPLES

Preparative Example 1

Figure 1A:
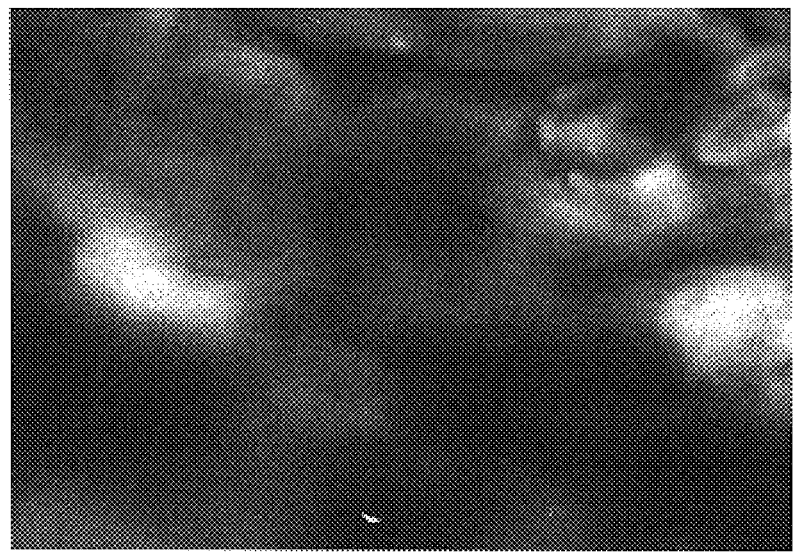
FIG. 1A is a TEM image of the polypropylene/clay nanocomposite prepared by the process as indicated in examples 1–4, showing exfoliated dispersion.

The Preparation of Modified Layered Clays Containing Multiple Epoxy Groups 50 grams of white montmorillonite (Clay 1,CEC=78 meq/100 g, d-spacing=15° A., Taiwan PeiKon Ceramics Co., Ltd) was dissolved in 4000 ml of deionized water and agitated at room temperature for 4 hours to allow swell to give an aqueous solution of clay. 38.25 grams of octodecyldimethyl(3-trimethoxysilylpropyl)ammonium chloride (C18-N—Si) was then dissolved in 200 ml of deionized water to obtain a clear canary solution. 10.9 grams of coupling agent, 3-glycidoxypropyl-trimethoxysilane (S510, epoxy 1) was dissolved in a mixed solution of 10 grams of water and 15 ml of ethanol to form a clear solution. The S510 solution and the C18-N—Si solution were then mixed, and the temperature was raised to 80° C. and agitated for 20 minutes to form a solution of a quaternary ammonium containing multiple terminal epoxy reactive groups. Thereafter, the mixed solution of S510/C-18-N—Si was added to the clay solution and the temperature was raised to about 75° C. and agitated for 2 hours to cause the modification reaction. A white precipitate of modified layered clay material was obtained after the modification reaction was complete. The white precipitate was then washed with hot water three times and filtrated and dried at room temperature for one day. The residual water of the dried precipitate was then extracted in a vacuum oven at a temperature of 100° C., resulting in the clay material (Clay 1-epoxy 1). The interlayer spacing (d-spacing) of the Clay 1-epoxy 1 was 31° A. when measured by X-ray diffraction. The content of the inorganic substance of the Clay 1-epoxy 1 measured by TGA at 850° C. is 67.68%.

The same procedures were then repeated except that the amount of the coupling agent were 1.2 times (epoxy 2) or 2 times (epoxy 3) of the amount of epoxy 1. The interlayer spacing of the obtained modified clays are summarized in Table 1 as indicated below.

TABLE 1

| Clay No. | modifier/clay weight ratio | d-spacing (° A) |
|---|---|---|
| Clay 1 | — | 15 |
| Clay 1/C18-N—Si | 1.2 | 24 |
| Clay 1-epoxy 1 | 1.2 | 31 |
| Clay 1-epoxy 2 | 1.44 | 35 |
| Clay 1-epoxy 3 | 2.4 | 42 |

As can be seen from the above Table 1, when coupling agent, epoxy 3 is used, the modified clay material has a d-spacing of 42° A., which is 16–27° A. greater than the unmodified clay 1 and the clay 1/C18-N—Si which is modified using no coupling agent.

Preparative Example 2

Blending of Modified Clays with PP-MA Compatilizer

The modified clay, clay 1-epoxy 1, obtained in preparative example 1 was poured into toluene, and agitated at 90° C. for 4 hours to completely swell the clay material. A polypropylene compatilizer solution was then prepared by dissolving Orevac-CA100, (Elf Atochem Co., Ltd. maleic anhydride-polypropylene copolymer, $M_w$=30000–50000) in toluene at a temperature of 110° C. for 20 minutes. The polypropylene comtatilizer solution was then blended with the swelled clay material at various weight ratios, i.e., 1/1, 1/2 and 1/3, and agitated at 110° C. for 1.5 hours to obtain a homogenous blend. The homogeneous blend was then evacuated and filtrated to remove the organic solution and dried in vacuum at 120° C. to prepare blends with different weight ratios of organomodified clay/polypropylene compatilizer.

Examples 1–4

The Preparation of Polypropylene/Clay Nanocomposites

The blends prepared in the above preparative example were then dry mixed with polypropylene(Fu-Chu Company, Taiwan, MFR=13) and extruded using a twin-screw extruder (L/D=15, MP-2015). The kneading was conducted at a barrel temperature of 210° C., and at a screw rotational frequency of 25 rpm. The pelletized extrudate was molded into test samples and tested for mechanical properties and dispersibility. The results are set forth or shown in Table 2 below and the drawings.

TABLE 2

| Test sample No. | PP (wt %) | [PP]-MA (wt %) | Clay 1-epoxy 1 (wt %) | Clay 1-epoxy 2 (wt %) | d-spacing by XRD analysis (° A) | Flexural modulus (kg/mm²) | Heat distortion temperature (66 psi) (° C.) | Amount of ash (wt %) |
|---|---|---|---|---|---|---|---|---|
| comparative example 1 | 100 | 0 | 0 | 0 | — | 174.75 | 120 | 0 |
| example 1 (nano-[PP]-1) | 80 | 10 | 0 | 10 | 34 (broad and weak) | 198.1 | 133.9 | |
| example 2 (nano-[PP]-2) | 80 | 10 | 10 | 0 | 31 (broad and weak) | 196 | 136.1 | 4–6 |
| example 3 (nano-[PP]-3) | 70 | 20 | 0 | 10 | no diffraction on peak | 185 | 134.3 | 4–6 |
| example 4 (nano-[PP]-4) | 70 | 20 | 10 | 0 | no diffraction on peak | 191 | 137.6 | 4–6 |

Figure 1B:
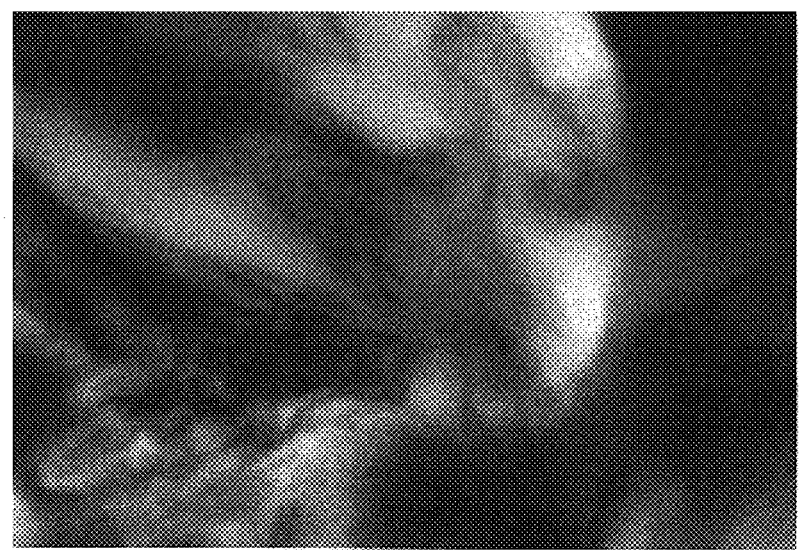
FIG. 1B is a TEM image of the polypropylene/clay nanocomposite prepared by the process as indicated in examples 1–4, showing intercalated dispersion.

As can be seen from the XRD analysis data indicated above and the TEM image of FIG. 1A and FIG. 1B, the inorganic layered clay of the nanocomposites of polyproylene/clay prepared from the examples 1–4 shows both intercalated dispersion and exfoliated dispersion. This is indicative that the inorganic layered clay containing multiple epoxy reactive groups is dispersed in the polypropylene matrix in a co-existent intercalated and exfoliated manner.

Figure 2:
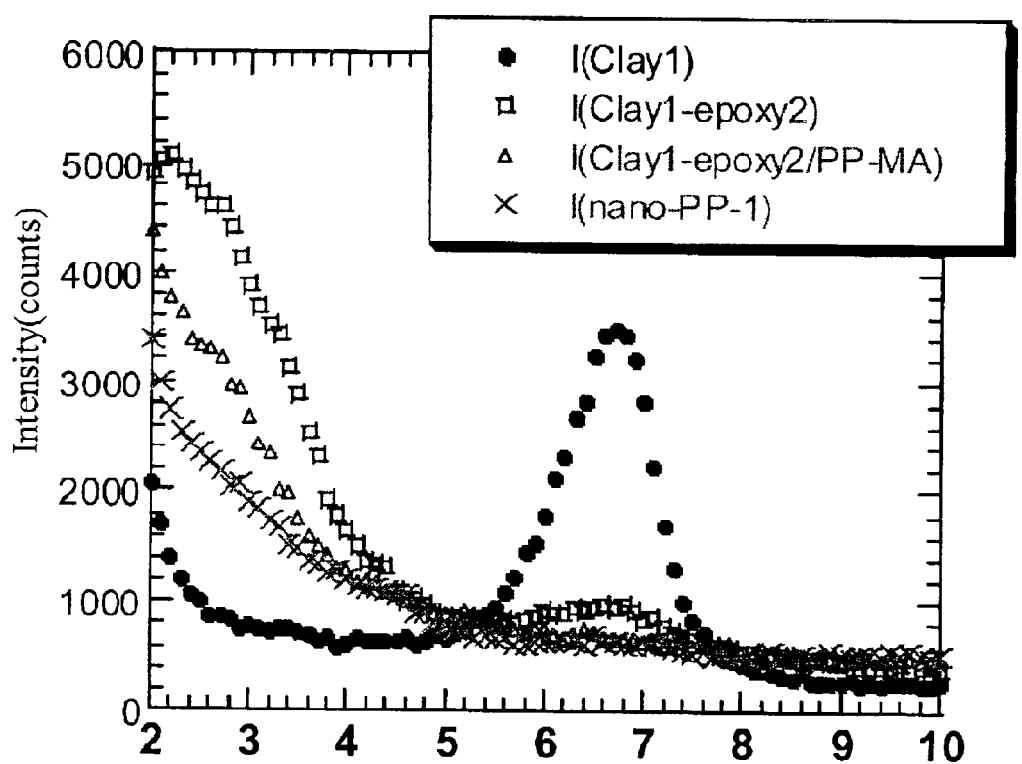
FIG. 2 is an XRD diagram of the polypropylene/clay nanocomposite prepared by the process as indicated in examples 1–4.

FIG. 2 shows the change of the dispersibility of the inorganic layered clay material in the process of the preparation of the PP/clay nanocomposite. It is found from the change of the dispersibility of the clay and the d-spacing that the high regular layered clay has a d-spacing of 15° A. and a narrow diffraction peak; the modified clay having epoxy reactive groups has a d-spacing of 35° A. and a broader diffraction peak; while the modified clay with the PP-MA compatilizer/clay=1/2 has a further broader diffraction perk, indicating a superior intercalation effect; and the PP/clay nanocomposite obtained by knead-melting has the most broad diffraction peak indicating the best dispersibility and intercalation.

Moreover, it is indicative from Table 2 that the mechanical properties of the test samples prepared from examples 1–4 are superior to those of the test sample prepared from comparative example 1, that is, polypropylene. In particular, the heat distortation temperature (H.D.T) of the test samples prepared from examples 1–4 are all 10° C. higher than those of the test sample prepared from comparative example 1. Among them, the H.D.T. of the test sample prepared from example 4 is 16° C. higher than that of the test sample prepared form comparative example 1. Also, as indicated in Table 2, the flexural modulus (F.M.) of all the test samples prepared from examples 1–4 are 14% higher than those of the test sample prepared from comparative example 1. Moreover, the 4–6% ash amount indicated in the last column of Table 2 reveals that adding only a small amount of organomodified clays makes a significant improvement on the mechanical properties of the PP/clay nanocomposites.

Comparative Example 2

10 grams of purified and $Na^+$ ion-exchanged layered clay (hereinafter $Na^+$-clay) was blended with 190 grams of polypropylene (Fu-Chi Company, Taiwan, MFR=13). A small amount of antioxidants was added during the blending process. The blend was then subject to melt kneading by using a twinscrew extruder (L/D=15, MP-2015) to obtained pelletized extrudate. The pelletized extrudate was then molded into comparative test samples. The comparative test samples were then inspected by by means of X-ray diffractometry and tested for flexural modulus, heat distortion temperature and ash amount, and the results are summarized in Table 3 below.

(ii) a substituent having —Si—O—Si— linkage and at least one terminal reactive group.

2. The polyolefin-based nanocomposite as claimed in claim 1, wherein the compatibilizer is an anhydride-modified polyolefin oligomer or a hydroxy-containing polyolefin oligomer.

3. The polyolefin-based nanocomposite as claimed in claim 2, wherein the compatibilizer is a maleic anhydride copolymer.

4. The polyolefin-based nanocomposite as claimed in claim 1, wherein the layered clay material has a cation exchange equivalent of 50–200 meq/100 g and is selected from the group consisting of smectite clay, vermiculite, halloysite, sericite and mica.

5. The polyolefin-based nanocomposite as claimed in claim 4, wherein the layered clay material is a smectite clay selected from the group consisting of montmorillonite, saponite, beidellite, nontronite, hectorite and stevensite.

6. The polyolefin-based nanocomposite as claimed in claim 1, wherein the reactive terminal group of the quaternary ammonium is selected from the group consisting of carboxy, hydroxy, amino, vinyl, sulfo and epoxy.

7. The polyolefin-based nanocomposite as claimed in claim 1, wherein the quaternary ammonium has the following structure:

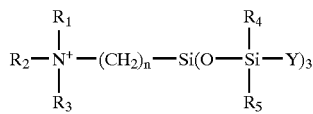

wherein $R_1$ is an alkyl having at least 15 carbon atoms;
$R_2$, $R_3$ can be same or different and are an alkyl having 1–12 carbon atoms;
$R_4$ and $R_5$ can be same or different and are methoxy or ethoxy; and
Y is a terminal group having a substituent selected from the group consisting of carboxy, hydroxy, amino, vinyl, sulfo and epoxy.

TABLE 3

| Test sample No. | [PP] (wt %) | PP-MA (wt %) | Clay 1-epoxy (wt %) | Clay 2-epoxy (wt %) | Clay 1 | XRD analysis (d-spacing) | Flexural modulus (kg/mm²) | Heat distortion temperature (66 psi) (° C.) | Amount of ash (wt %) |
|---|---|---|---|---|---|---|---|---|---|
| Comparative example 2 | 95 | 0 | 0 | 0 | 5 | 15 | 178.6 | 125.2 | 5 |

It is seen from the test results of Table 3 that without modifying the clay material by the process of the invention, the flexural modulus and the heat distortion temperature are lower, indicating that the present invention can provide a means for improving the mechanical properties of a polypropylene/clay nanocomposite.

What is claimed is:

1. A polyolefin-based nanocomposite prepared by melt kneading a mixture comprising:
   (A) 40–99.8% by weight of a matrix polymer comprising polyolefin;
   (B) 0.1–30% by weight of a polyolefin compatibilizer containing polar reactive groups; and
   (C) 0.1–30% by weight of a layered clay material having a quaternary ammonium bonded to the surface thereof, wherein the quaternary ammonium contains (i) at least one alkyl group having at least 15 carbon atoms; and 8. The polyolefin-based nanocomposite as claimed in claim 1, wherein the layered clay material is partially exfoliated.

9. The polyolefin-based nanocomposite as claimed in claim 1, wherein the layered clay material has a d-spacing of at least 30Å.

10. The polyolefin-based nanocomposite as claimed in claim 1, wherein the layered clay material has a d-spacing of at least 40 Å.

11. The polyolefin-based nanocomposite as claimed in claim 1, having a heat distortion temperature and flexural modulus higher than the polyolefin.

12. A method of modifying a layered clay material, comprising the following steps:
   (a) subjecting a quaternary ammonium having an alkoxysilyl group and an alkoxysilane having a reactive terminal group to a sol-gel reaction to obtain a quaternary ammonium containing at least one terminal reactive group and —Si—O—Si linkage;

(b) ion-exchanging the obtained quaternary ammonium and the layered clay material to intercalate said quaternary ammonium into the interlayers of said layered clay material to obtain a modified layered clay material.

13. The method as claimed in claim 12, wherein the layered clay material has a cation exchange equivalent of 50–200 meq/100 g and is selected from the group consisting of smectite clay, vermiculite, halloysite, sericite and mica.

14. The method as claimed in claim 12, wherein the layered clay material is a smectite clay selected from the group consisting of montmorillonite, saponite, beidellite, nontronite, hectorite and stevensite.

15. The method as claimed in claim 12, wherein the reactive terminal group of the quaternary ammonium is selected from the group consisting of carboxy, hydroxy, amino, vinyl, sulfo and epoxy.

16. The method as claimed in claim 12, wherein the quaternary ammonium has the following structure:

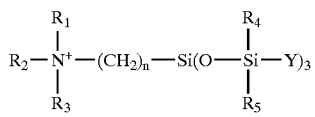

wherein $R_1$ is an alkyl having at least 15 carbon atoms;

$R_2$, $R_3$ can be same or different and is an alkyl having 1–12 carbon atoms;

$R_4$ and $R_5$ can be same or different and is methoxy or ethoxy; and

Y is a terminal group having a substituent selected from the group consisting of carboxy, hydroxy, amino, vinyl, sulfo and epoxy.

17. The method as claimed in claim 12, wherein the modified clay material has a d-spacing greater than 30 Å.

18. A method of preparing a polyolefin-based nanocomposite, comprising the following steps:

(a) subjecting a quaternary ammonium having an alkoxysilyl group and an alkoxysilane having a reactive terminal group to a sol-gel reaction to obtain a quaternary ammonium containing at least one terminal reactive group and —Si—O—Si linkage;

(b) ion-exchanging the obtained quaternary ammonium and a layered clay material to intercalate said quaternary ammonium into the interlayers of said layered clay material to obtain a modified layered clay material;

(c) blending said modified layered clay material with a polyolefin compatibilizer containing polar reactive groups to obtain a homogenous blend; and (d) melt kneading said blend and a matrix polymer containing polyolefin to obtain said polyolefin-based nanocomposite.

19. The method as claimed in claim 18, wherein the reactive terminal group of the quaternary ammonium is selected from the group consisting of carboxy, hydroxy, amino, vinyl, sulfo and epoxy.

20. The method as claimed in claim 18, wherein the quaternary ammonium has the following structure:

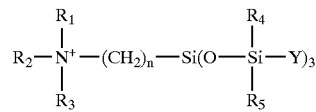

wherein $R_1$ is an alkyl having at least 15 carbon atoms;

$R_2$, $R_3$ can be same or different and is an alkyl having 1–12 carbon atoms; $R_4$ and $R_5$ can be same or different and is methoxy or ethoxy; and Y is a terminal group having a substituent selected from the group consisting of carboxy, hydroxy, amino, vinyl, sulfo and epoxy.

21. The method as claimed in claim 18, wherein the compatibilizer is an anhydride-modified oligomer or a hydroxy-containing polyolefin oligomer.

22. The method as claimed in claim 21, wherein said compatibilizer is a polypropylene-maleic anhydride copolymer.

23. The method as claimed in claim 18, wherein the modified clay material has a d-spacing greater than 30 Å.

24. The method as claimed in claim 18, wherein the layered clay after melt kneading has a d-spacing greater than 40 Å.

25. The method as claimed in claim 18, wherein the layered clay material after melt kneading is exfoliated.

26. The method as claimed in claim 18, wherein the melt kneading is conducted at a temperature which is 20–30° C. higher than the melting point of the matrix polymer.

27. A method of preparing a polyolefin-based nanocomposite, comprising the following steps:

(a) subjecting a quaternary ammonium having an alkoxysilyl group and an alkoxysilane having a reactive terminal group to a sol-gel reaction to obtain a quaternary ammonium containing at least one terminal reactive group and —Si—O—Si linkage;

(b) ion-exchanging the obtained quaternary ammonium and a layered clay material to intercalate said quaternary ammonium into the interlayers of said layered clay material to obtain a modified-layered clay material; and (c) melt kneading said modified layered clay material, a polyolefin compatibilizer containing polar reactive groups, and a matrix polymer containing polyolefin to obtain said polyolefin-based nanocomposite.

* * * * *